(12) United States Patent
Nam et al.

(10) Patent No.: US 7,808,954 B2
(45) Date of Patent: Oct. 5, 2010

(54) METHOD AND SYSTEM FOR CONTROLLING DATA RATE IN A COMMUNICATION SYSTEM

(75) Inventors: Seung-Hoon Nam, Seoul (KR); Cheol-Woo You, Seoul (KR); In-Soo Hwang, Gyeongsan-si (KR); Yung-Soo Kim, Seongnam-si (KR); Tarokh Vahid, Cambridge, MA (US)

(73) Assignee: Samsung Electronics Co., Ltd (KR)

( * ) Notice: Subject to any disclaimer, the term of this patent is extended or adjusted under 35 U.S.C. 154(b) by 784 days.

(21) Appl. No.: 11/603,652

(22) Filed: Nov. 22, 2006

(65) Prior Publication Data

US 2007/0133480 A1 Jun. 14, 2007

Related U.S. Application Data

(60) Provisional application No. 60/739,039, filed on Nov. 22, 2005.

(30) Foreign Application Priority Data

Jun. 7, 2006 (KR) ...................... 10-2006-0051173

(51) Int. Cl.
*H04B 7/216* (2006.01)
(52) U.S. Cl. .................. 370/335; 370/468; 370/410
(58) Field of Classification Search .................. 370/465, 370/468, 410, 332; 455/69, 24
See application file for complete search history.

(56) References Cited

U.S. PATENT DOCUMENTS

| 5,654,958 | A | * | 8/1997 | Natarajan ................... 370/410 |
| 6,134,230 | A | * | 10/2000 | Olofsson et al. ............ 370/337 |
| 2003/0067899 | A9 | * | 4/2003 | Chen et al. .................. 370/335 |
| 2003/0123477 | A1 | * | 7/2003 | Gollamudi et al. .......... 370/465 |
| 2005/0107036 | A1 | | 5/2005 | Song et al. |

FOREIGN PATENT DOCUMENTS

KR 102005004929 5/2005

* cited by examiner

*Primary Examiner*—Ricky Ngo
*Assistant Examiner*—David Oveissi
(74) *Attorney, Agent, or Firm*—The Farrell Law Firm, LLP

(57) ABSTRACT

A system and method are provided for controlling a data rate in a communication system. A transmitter sets threshold values for classifying Modulation and Coding Scheme (MCS) levels. When receiving information about an MCS level desired to be used in the receiver, the transmitter sets an MCS level to be actually used in the receiver and transmits information about the set MCS level to the receiver. When detecting that the information is to be transmitted to the transmitter, the receiver computes instantaneous link capacity using a channel estimation result, sets an MCS level mapped to the instantaneous link capacity, and transmits information about the set MCS level to the transmitter. The receiver receives the information about the MCS level to be actually used from the transmitter.

10 Claims, 3 Drawing Sheets

METHOD AND SYSTEM FOR CONTROLLING DATA RATE IN A COMMUNICATION SYSTEM

PRIORITY

This application claims priority under 35 U.S.C. §119 to applications filed in the United States Patent and Trademark Office on Nov. 22, 2005 and assigned Ser. No. 60/739,039 and in the Korean Intellectual Property Office on Jun. 7, 2006 and assigned Ser. No. 2006-51173, the contents of which are incorporated herein by reference.

BACKGROUND OF THE INVENTION

1. Field of the Invention

The present invention relates generally to a communication system, and more particularly to a method and system for controlling a data rate in a communication system.

2. Description of the Related Art

A process for maximizing throughput supportable in a communication system is an important factor in determining the performance of the communication system. Thus, active research is being conducted on various schemes to maximize the throughput with certain level of reliability in the communication system.

For example, a Single-Input Single-Output (SISO) communication system controls a data rate on the basis of a Signal to Interference and Noise Ratio (SINR) in order to maximize the throughput. Among schemes for controlling the data rate on the basis of the SINR, a typical scheme is Adaptive Modulation and Coding (AMC). The AMC scheme sets a Modulation and Coding Scheme (MCS) level to be used in a signal receiver, for example, a Mobile Station (MS), on the basis of the SINR and controls a data rate on the basis of the set MCS level. That is, when the AMC scheme is used, the data rate of the MS is set only by the SINR therein.

The communication system is developing into a system for providing MSs with services for high-speed large-capacity signal transmission and reception. As the high-speed large-capacity signal transmission and reception are required, a Multiple-Input Multiple-Output (MIMO) communication system is being actively considered which can transmit and receive high-speed large-capacity signals by throughput enhancement, while obtaining space, time and frequency diversity which enables more reliable data transmission.

Because the MIMO communication system uses multiple transmit and receive antennas, its throughput may be degraded when a data rate of the MS is controlled by considering only the SINR of the MS as in the SISO communication system. This is because only the SISO-based SINR is considered without using advantages of the MIMO system which can support either improved throughput and reliability, or both.

Consequently, the scheme for controlling the data rate based on SISO SINR is not proper for the MIMO communication system. Hence, a need exists for a data rate control scheme capable of maximizing throughput in a MIMO communication system.

SUMMARY OF THE INVENTION

It is, therefore, an object of the present invention to provide a system and method for controlling a data rate in a MIMO communication system.

It is another object of the present invention to provide a system and method for controlling a data rate by controlling use of an MCS level capable of minimizing average capacity loss in a MIMO communication system.

In accordance with the present invention, there is provided a method for controlling a data rate in a transmitter of a communication system. The method includes setting threshold values for classifying MCS levels to minimize average capacity loss.

In accordance with the present invention, there is provided a method for controlling a data rate in receiver of a communication system. The method includes computing instantaneous link capacity using a channel estimation result when detecting that information about an MCS level desired to be used in the receiver is to be transmitted to a transmitter, and setting an MCS level mapped to the computed instantaneous link capacity and transmitting information about the set MCS level to the transmitter.

In accordance with the present invention, there is provided a system for controlling a data rate in a communication system. The system includes a transmitter for setting threshold values for classifying MCS levels, setting an MCS level to be actually used in a receiver when receiving information about an MCS level desired to be used in the receiver, and transmitting information about the set MCS level to the receiver, and the receiver for computing instantaneous link capacity using a channel estimation result when detecting that the information about the MCS level desired to be used in the receiver is to be transmitted to the transmitter, setting an MCS level mapped to the instantaneous link capacity, transmitting information about the set MCS level to the transmitter, and receiving the information about the MCS level to be actually used in the receiver from the transmitter.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Operation principles of preferred embodiments of the present invention will be described in detail herein below with reference to the accompanying drawings. In the following description, detailed descriptions of functions and configurations incorporated herein that are well known to those skilled in the art are omitted for the sake of clarity and conciseness. It is to be understood that the phraseology and terminology employed herein are for the purpose of description and should not be regarded as limiting the present invention.

The present invention proposes method and system for controlling data rate between a transmitter, for example, a base station (BS), for managing a service area and a receiver, for example, a mobile station (MS), for receiving communication service from the transmitter in a communication system.

Figure 1:
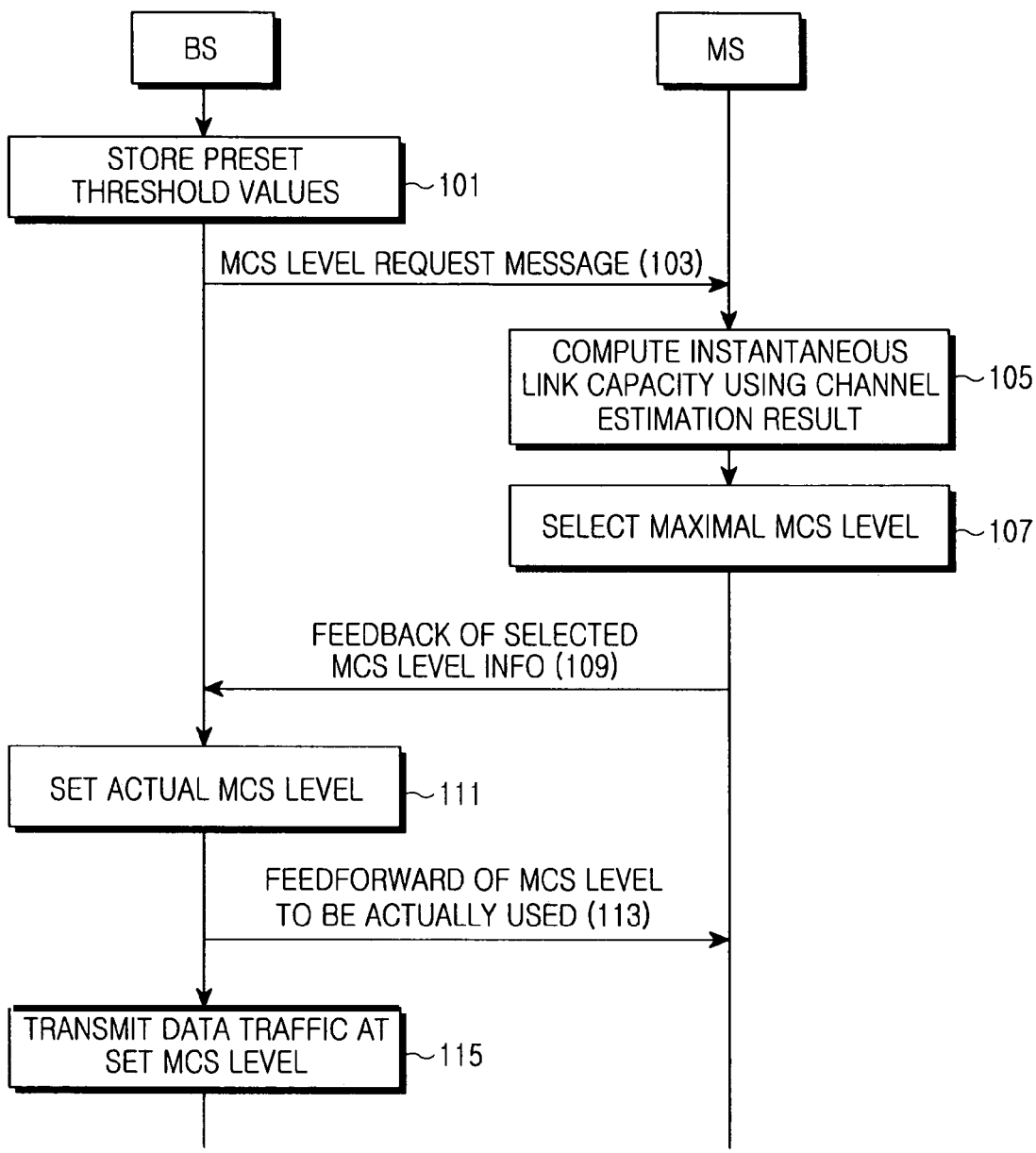
FIG. 1 is a signal flow diagram illustrating a process for controlling a data rate in a MIMO communication system in accordance with the present invention.

FIG. 1 is a signal flow diagram illustrating a process for controlling a data rate in a Multiple Input Multiple Out (MIMO) communication system in accordance with the present invention.

In FIG. 1, it is assumed that a BS is provided with a table of threshold values at Modulation and Coding Scheme (MCS) levels when an Adaptive Modulation and Coding (AMC) scheme is used in step 101. Herein, the threshold values can define instantaneous link capacity ranges on an MCS level-by-MCS level basis such that the MCS levels are available. The number of MCS levels supportable in the BS is set on the basis of the number of bits including feedback information capable of being fed back from a Mobile Station (MS). That is, as the number of bits including the feedback information increases, the BS increases the number of MCS levels.

The BS requests that the MS give notification of its desired MCS level by transmitting an MCS level request message to the MS in step 103. When receiving the MCS level request message from the BS, the MS estimates its own channel and computes instantaneous link capacity using a channel estimation result in step 105. A scheme for computing the instantaneous link capacity will be described in detail below. The MS sets an MCS level to be used therein on the basis of the computed instantaneous link capacity in step 107. Also, a scheme for setting the MCS level will be described in detail below.

The MS feeds back information about the set MCS level to the BS in step 109. The BS receives the MCS level information from the MS and sets an MCS level to be actually used in the MS by considering the received MCS level information and its own situation in step 111. Herein, the MCS level to be actually used in the MS may be equal to or different from that requested by the MS. For example, the MS desires to use MCS Level 3, but may not use MCS Level 3 according to the situation. Thus, the BS provides feedforward of information about the MCS level to be actually used in the MS in step 113.

Thus, the BS and the MS perform actual data transmission and reception operations at the set MCS level in step 115.

An example of a data rate control process for notifying the BS of an MCS level desired to be used in the MS only when the BS requests that the MS give notification of the MCS level desired to be used therein has been described with reference to FIG. 1. The MS can notify the BS of the desired MCS level without a request of the BS, if desired or periodically. The scheme for computing instantaneous link capacity in the MS will be described with reference to Equation (1).

$$C(t) = \log_2 \det\left(I + \frac{1}{N} H(t)H(t)^* SNR\right) \quad (1)$$

In Equation (1), C(t) is the instantaneous link capacity and N is the number of transmit antennas used in the BS. H(t) is a time-variant channel and H(t)* is a conjugate transpose or Hermitian matrix of H(t). In Equation (1), SNR is a Signal to Noise Ratio (SNR) and is defined as $P/\sigma^2$, where $\sigma^2$ is a variance value of a noise signal added to a reception stage.

It is assumed that the number of bits available to feed back MCS level information from the MS is 'b'. As 'b' increases, the number of available MCS levels increases. As the number of MCS levels increases, a relatively exact channel situation of the MS can be reflected. However, as the number of bits used to feed back MCS level information increases, an amount of resources available to transmit and receive data decreases.

In contrast, as the number of bits used to feed back MCS level information decreases, an amount of resources available to transmit and receive data increases. Thus, 'b' should be set by considering the overall system performance.

Next, the scheme for setting an MCS level to be used in the MS will be described with reference to Equation (2).

First, assuming that the number of bits for feeding back the MCS level information is 'b', the number of MCS levels $q=2^b-1$. Herein, it is assumed that q MCS levels are $C_0 \sim C_q$ ($0=C_0<C_1 \leq C_2 \leq \ldots \leq C_q<\infty$).

$$\overline{C(t)} = \max_{C_i \leq C(t)} C_i \quad (2)$$

In Equation (2), $\overline{C(t)}$ is a maximal data rate for transmission by the MS. Thus, the MS should select an MCS level such that a data rate to be actually used is set to be less than C(t). For example, when the instantaneous link capacity of the MS is a median value between threshold values of MCS levels $C_3 \sim C_4$, the MS sets its MCS level to be used to $C_3$. That is, the MS cannot use an MCS level mapped to instantaneous link capacity more than its own instantaneous link capacity. The MS uses MCS Level 3 even though actual instantaneous link capacity has the median value between the threshold values of MCS Levels $C_3 \sim C_4$. The MS sets its MCS Level to be used to MCS Level 3. The MS may use an MCS level lower than MCS Level $C_3$ in a certain channel condition.

The case where the MS sets the MCS level mapped to the computed instantaneous link capacity has been described. However, there is a limitation in improving the throughput when the MCS level is set by considering only the instantaneous link capacity in a uniformly partitioned section. If the capacity difference in a section is huge, there may be a huge capacity loss in that section. Thus, threshold values for classifying the MCS levels should be exactly set. That is, the threshold values for classifying the MCS levels should be set such that capacity loss is minimized.

The capacity loss is computed as shown in Equation (3).

$$L(C(t),\overline{C(t)})=C(t)-\overline{C(t)} \quad (3)$$

In Equation (3), $L(C(t),\overline{C(t)})$ is a capacity loss value indicative of a difference between instantaneous link capacity C(t) and actual link capacity $\overline{C(t)}$. When the MS computes the capacity loss value using Equation (3), the threshold values for classifying the MCS levels are determined to be inappropriately set if the capacity loss value is large. However, if the capacity loss value is small or almost absent, the threshold values for classifying the MCS levels are determined to be appropriately set.

On the basis of the capacity loss value computed by Equation (3), an average capacity loss value is computed as shown in Equation (4).

$$U(x_1, \ldots, x_q)=\int_0^\infty L(x,\bar{x})\beta(x)f(x)dx \quad (4)$$

In Equation (4), U is the average capacity loss value. $\bar{x}=_{x_i \leq x}^{max} x_i$. x is a threshold value based on instantaneous link capacity. The average capacity loss value can be computed by the integral of $f(x)$ from $x=0$ to $x=\infty$ that considers such information as the capacity loss value of Equation (3), a channel situation of limited link capacity C and a cell size. In Equation (4), $f(x)$ is a probability distribution function of the instantaneous link capacity x and is affected by a probability distribution function of a radio channel H(t). In Equation (4), $\beta(x)$ is a weight function affecting a threshold value according to characteristics of an AMC rule in a wireless communication system. That is, when an AMC rule for minimizing the absolute value of the average capacity loss value is preferred, $\beta(x)$ can be set to a constant regardless of x. When a percentage capacity loss value rather than the absolute value of the capacity loss value is desired to be minimized, β(x)=1/x. As described above, the system can select and use the function of β(x) according to characteristics of a desired AMC rule. If the average capacity loss value decreases, it can be interpreted that a number of feedback information bits and threshold values for classifying the MCS levels are properly set.

In the present invention, the threshold values for classifying the MCS levels are set such that the average capacity loss is minimized. The MS selects an MCS level mapped to its own instantaneous link capacity from among MCS levels mapped to the set threshold values. Thus, a data rate can be controlled such that the overall throughput of a MIMO communication system is maximized.

Figure 2:
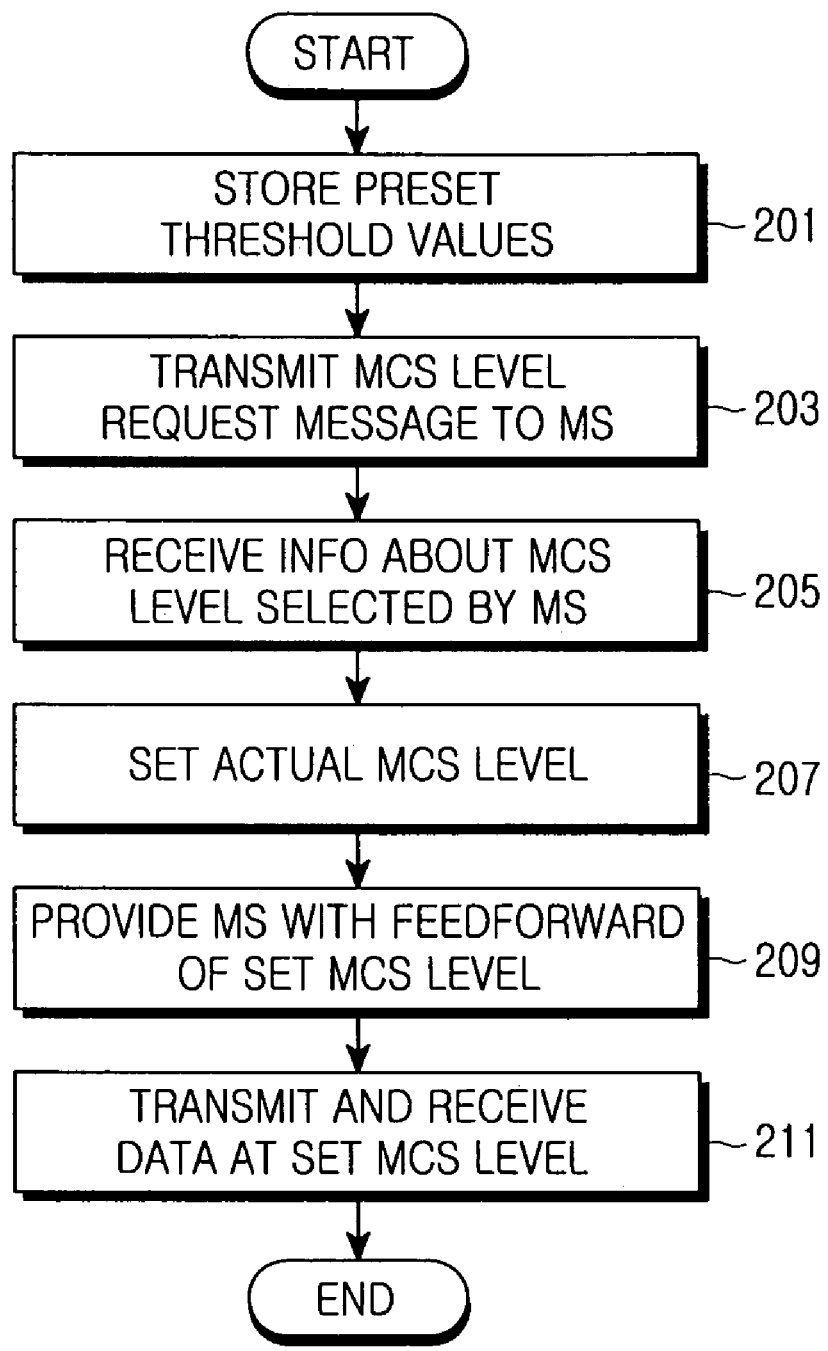
FIG. 2 is a flowchart illustrating an operation process of a BS of FIG. 1.

FIG. 2 is a flowchart illustrating the operation process of the BS of FIG. 1.

Referring to FIG. 2, the BS stores threshold values set to classify MCS levels in step 201. The threshold values for classifying the MCS levels are set to minimize average capacity loss of the MS. The BS transmits an MCS level request message to the MS in step 203. The BS receives information about an MCS level selected by the MS in response to the MCS level request message in step 205. The BS sets an MCS level to be actually used in the MS by considering its own situation and the selected MCS level information in step 207. The BS provides the MS with feedforward of information about the set MCS level in step 209. In step 211, the BS transmits data to and receives data from the MS at the set MCS level and ends the operation process.

Figure 3:
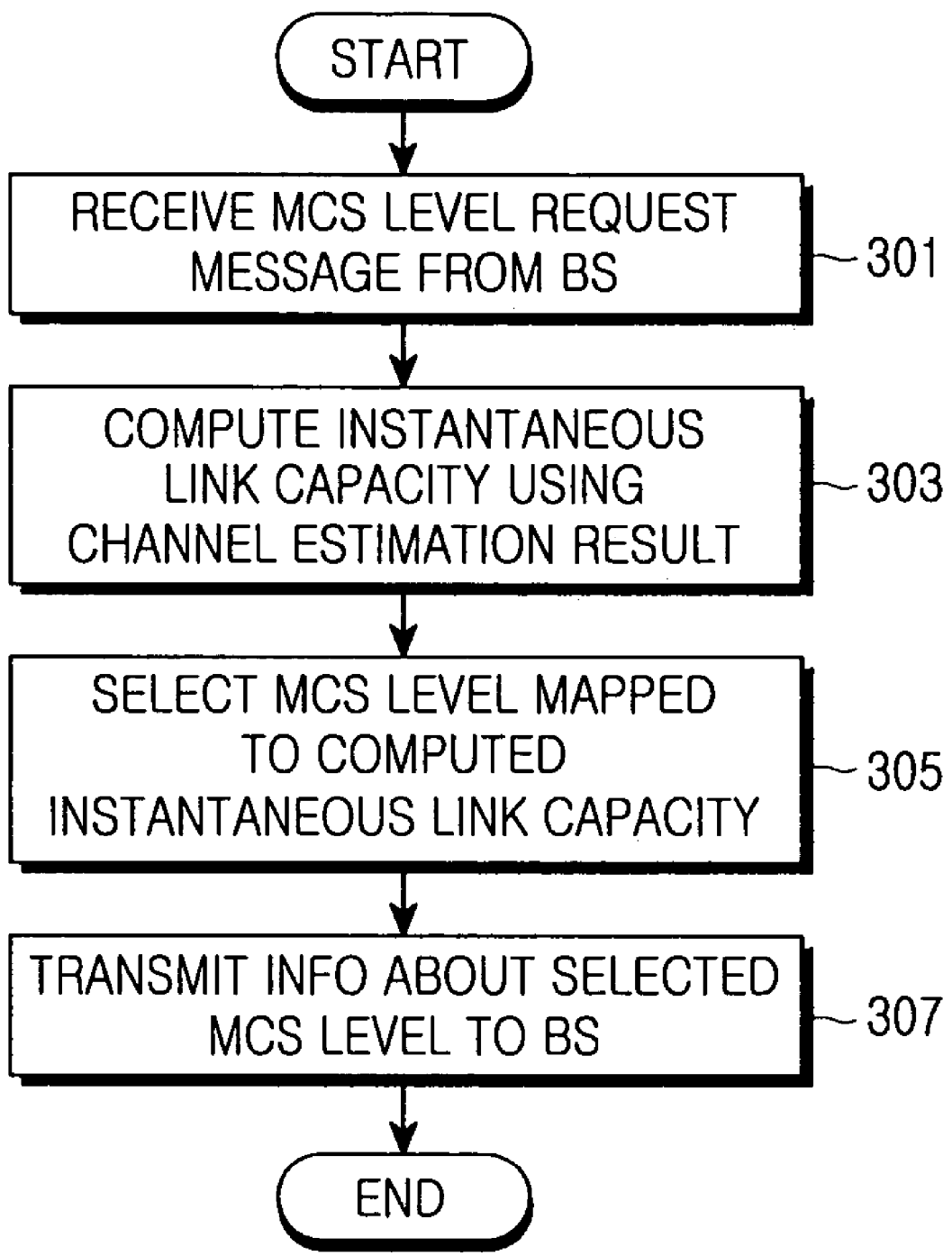
FIG. 3 is a flowchart illustrating an operation process of an MS of FIG. 1.

FIG. 3 is a flowchart illustrating the operation process of the MS of FIG. 1.

Referring to FIG. 3, the MS receives an MCS level request message from the BS in step 301. The MS computes instantaneous link capacity using a channel estimation result upon reception of the MCS level request message in step 303. The MS selects an MCS level mapped to the computed instantaneous link capacity in step 305. In step 307, the MS transmits information about the selected MCS level to the BS and ends the operation process.

As is apparent from the above description, the present invention provides a data rate control system and method that can maximize throughput while considering a channel state of an MS in a MIMO communication system and that can improve the overall performance of the MIMO communication system.

Although the preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A system for controlling a data rate in a communication system, comprising:
   a transmitter for setting threshold values for classifying Modulation and Coding Scheme (MCS) levels, setting an MCS level to be actually used in a receiver when receiving information about an MCS level desired to be used in the receiver, and transmitting information about the set MCS level to the receiver; and
   the receiver for computing an instantaneous link capacity using a channel estimation result when detecting that the information about the MCS level desired to be used in the receiver is to be transmitted to the transmitter, setting an MCS level mapped to the instantaneous link capacity, transmitting information about the set MCS level to the transmitter, and receiving the information about the MCS level to be used in the receiver from the transmitter, wherein the instantaneous link capacity is determined by $$C(t) = \log_2 \det\left(I + \frac{1}{N}H(t)H(t)^*SNR\right)$$

where C(t) is the instantaneous link capacity, N is the number of transmit antennas used in the transmitter, H(t) is a time-variant channel, H(t)* is a conjugate transpose of Hermitian matrix H(t), SNR is a Signal to Noise Ratio (SNR) and is defined as $$\frac{P}{\sigma^2},$$

where $\sigma^2$ is a variance value of a noise signal added to the receiver.

2. The system of claim 1, wherein the transmitter sets the threshold values to minimize average capacity loss of the receiver.

3. The system of claim 1, wherein the transmitter requests that the receiver transmits the information about the MCS level desired to be used in the receiver.

4. The system of claim 1, wherein the set MCS level in the receiver comprises information about at least one of a modulation order, a coding ratio and Multiple Input Multiple Output (MIMO) spatial multiplexing information.

5. The system of claim 1, wherein the receiver sets the MCS level to be used in the receiver and transmits the information about the set MCS level to the transmitter, when receiving a request indicating that the information about the MCS level desired to be used in the receiver is to be transmitted to the transmitter.

6. The system of claim 5, wherein the receiver periodically provides the transmitter with the information about the MCS level desired to be used in the receiver.

7. The system of claim 5, wherein the receiver sets one of MCS levels mapped to an instantaneous link capacity less than the computed instantaneous link capacity to the MCS level to be used in the receiver.

8. A method for controlling a data rate in a transmitter of a communication system, comprising:
   setting threshold values for classifying Modulation and Coding Scheme (MCS) levels to minimize average capacity loss of a receiver;
   receiving information about an MCS level desired to be used in the receiver from the receiver; and
   setting an MCS level to be used in the receiver using the received desired MCS level, and transmitting information about the set MCS level to the receiver,
   wherein the desired MCS level is mapped to an instantaneous link capacity, and the instantaneous link capacity is computed by using a channel estimation result in the receiver,
   wherein the average capacity loss is based on an instantaneous link capacity determined by $$C(t) = \log_2 \det\left(I + \frac{1}{N}H(t)H(t)^*SNR\right)$$

where C(t) is the instantaneous link capacity, N is the number of transmit antennas used in the transmitter, H(t) is a time-variant channel, H(t)* is a conjugate transpose of Hermitian matrix H(t), SNR is a Signal to Noise Ratio (SNR) and is defined as $$\frac{P}{\sigma^2},$$

where $\sigma^2$ is a variance value of a noise signal added to the receiver.

9. A method for controlling a data rate in a receiver of a communication system, comprising:
   computing an instantaneous link capacity using a channel estimation result when detecting that information about a Modulation and Coding Scheme (MCS) level desired to be used in the receiver is to be transmitted to a transmitter; and
   setting an MCS level mapped to the computed instantaneous link capacity and transmitting information about the set MCS level to the transmitter,
   wherein the instantaneous link capacity is determined by $$C(t) = \log_2 \det\left(I + \frac{1}{N} H(t)H(t)^* SNR\right)$$

where C(t) is the instantaneous link capacity, N is the number of transmit antennas used in the transmitter, H(t) is a time-variant channel, H(t)* is a conjugate transpose of Hermitian matrix H(t), SNR is a Signal to Noise Ratio (SNR) and is defined as $$\frac{P}{\sigma^2},$$

where $\sigma^2$ is a variance value of a noise signal added to the receiver.

10. The method of claim 9, further comprising:
   receiving information about an MCS level to be used in the receiver from the transmitter after transmitting the information about the set MCS level to the transmitter.

* * * * *